United States Patent [19]
Terrell

[11] 3,924,993
[45] Dec. 9, 1975

[54] MOLD APPARATUS WITH MOVABLE WEB FORMING BLADE

[75] Inventor: Christopher E. Terrell, London, England

[73] Assignee: Twinlock Limited, Beckenham, England

[22] Filed: Dec. 28, 1973

[21] Appl. No.: 429,188

Related U.S. Application Data

[62] Division of Ser. No. 164,626, July 21, 1971, abandoned.

[52] U.S. Cl. ............ 425/242 R; 425/249; 425/468; 425/DIG. 5
[51] Int. Cl.² ...................... B29C 1/14; B29F 1/00
[58] Field of Search .......... 425/249, DIG. 5, 242 R, 425/468; 264/328

[56] References Cited
UNITED STATES PATENTS

| | | | |
|---|---|---|---|
| 2,578,719 | 12/1951 | Mayer et al. | 425/249 |
| 2,687,157 | 8/1954 | Cowan | 264/242 X |
| 3,718,415 | 2/1973 | De Felice | 425/DIG. 5 |

*Primary Examiner*—Robert D. Baldwin

[57] ABSTRACT

A plastics article which incorporates an integral web of reduced thickness is compressed at the desired location of the web whilst the material of the article is still in a mouldable condition during manufacture in an injection mould. The injection mould incorporates a displaceable blade, plate or block which is retracted from the mould cavity during injection of the plastics material and is thereafter projected into the mould cavity to form the web.

3 Claims, 6 Drawing Figures

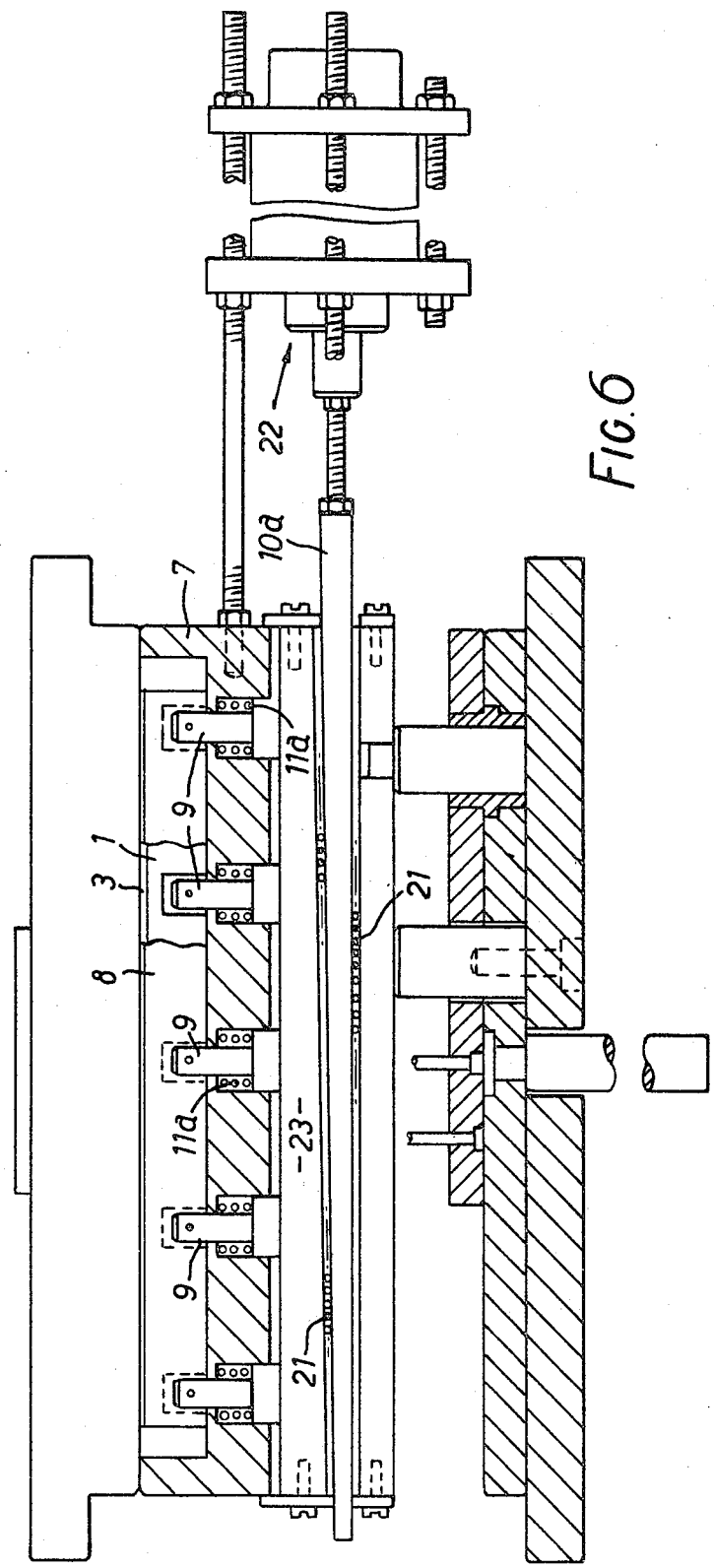

MOLD APPARATUS WITH MOVABLE WEB FORMING BLADE

This is a division of application Ser. No. 164,626, filed July 21, 1971, now abandoned.

The invention relates to moulded plastics articles comprising portions which are integrally connected by a web or membrane of reduced cross-section. The invention has particular application to leaf hinges in which the component leaves are integrally moulded from plastics material, to products incorporating such hinges, to a method of making the hinges or other moulded plastics articles and to moulding equipment for performing the method. Although the invention has been specifically developed for stationary binders and will for the most part be described in relation thereto, its application is by no means limited to binders.

Moulded leaf hinges have recently been employed for stationery binders or book covers in which a front and a back cover are integrally pivoted to a spine. In this case, each binder employs or constitutes a three-leaf hinge in so far as the covers represent two leaves and the spine a third leaf of the hinge. The covers and spine are simultaneously injection moulded in a single moulding tool such as that described in prior British Patent No. 1,138,964 or No. 1,139,916, the pivotal interconnections between the covers and spine being formed by flexible webs or membranes of a very much reduced thickness as compared with the thicknesses of the covers. These webs are created by ribs in the moulding tool that suitably constrict the mould cavity. However, as more fully described in British Patent No. 1,160,975, difficulties arise in forcing the molten plastics material past the constrictions in the mould cavity. We have experienced the very same problem but have been seeking a solution that is based on different principles and will find a wider practical application by means of permitting extremely thin webs to be formed.

More particularly, instead of inserting prefabricated hinge inserts in the injection mould in the manner described in aforementioned 1,160,975, we have worked on the line that the strength of plastics leaf hinges, especially those in which the hinge leaves are expected to pivot through 180° or even larger angles, can be considerably improved, the required injection pressure can be kept to a minimum, homogeneity is preserved and weld or break lines that might appear across prefabricated hinge inserts can be avoided if the constrictions in the mould cavity are less severe so as to enable the molten plastics material to flow more readily, the resultant thicker web about which the leaves of the hinge are to pivot being subsequently rolled to the required 'thinness'.

In our experiments, however, we have found that the two-stage process that is involved by moulding followed by rolling would not only be too costly but is also severely restricted in its application because there is a limit to which plastics material (especially polypropylene) can be deformed by cold rolling and still have adequate strength to withstand repeated flexure. In other words, if the or each constriction in the injection mould is made sufficiently shallow to meet the moulding requirements of ready flow of the plastics material and the avoidance of its premature solidification at the location of each constriction, then it is likely that the thickness of the resultant web will need to be severely reduced by subsequent rolling to an extent that is disadvantageous to the strength of the web or, if a strong and relatively thin web is required, the corresponding constriction in the mould cavity will still undesirably impede the flow of plastics during moulding.

According to the present invention, a method of making a plastics article having at least two portions integrally interconnected by a web or membrane of the same material comprises moulding the article in an injection mould and compressing the plastics material at the location of the desired web or membrane whilst the material is still in the mould, preferably whilst most of the material is still in a mouldable condition. In other words, in the case of a leaf hinge the invention proposes formation of the hinge line or web as part of the moulding cycle after the plastics material has been injected into the mould cavity. Whilst the plastics material is being injected into the mould cavity, there need now be no constriction or no severe constriction to impede its flow into the remotest crevices or to cause its premature solidification. After injection, the required web is formed by compression or, if the configuration of the mould cavity was such as to form a radimentary or thick web, the latter is completed and/or reduced to the desired thinness by compression, before the article is removed from the mould.

A suitable moulding tool for performing this method may comprise a displaceable blade or plate or block which, during injection of the plastics material, is substantially retracted from the mould cavity, preferably completely retracted so as to be flush with adjoining surfaces bounding the mould cavity, but which, as soon as injection has been completed (by which time the plastics material will have solidified at the mould cavity portion adjacent the sprue or sprues, i.e. at the point or points of the mould cavity adjacent to where injection took place), is adapted to be projected into the mould cavity at the location where the web is to be formed. During such movement of the blade or plate or blocks into the mould cavity, the plastics material is compressed to form the web or membrane and the material that is displaced during this operation takes up space vacated by the plastics material by natural shrinkage during solidification or gives rise to greater density of the plastics material adjacent the blade or plate, i.e. just where additional strength is required, or both. The fact that there is now no longer any severe constriction in the mould cavity during injection improves plastics flow to such an extent that a multi-impression moulding tool is feasible. Manufacture takes place in a single operation, only a two-part moulding tool is required and faster filling of the mould cavity not only leads to faster production but also overcomes problems such as flow marks, therefore improving the quality of the moulding.

In our experiments employing the invention, we have been able to produce good quality moulded articles with webs as thin as 0.08 mm without splitting the material and, what is more, it has been possible to use plastics materials which were hitherto impossible to mould satisfactorily with thin webs, for example polypropylene having a high melt flow index (low density). To produce really thin webs it is of course necessary that the plastics material be substantially homogeneous and of substantially constant density during injection and that injection be effective to fill the mould cavity substantially completely. The results would be made inferior if the plastics material is not homogeneous or if there are spaces or air or gas occlusions caused such as by chemical reaction or forming by the time the blade, plate or block is projected into the mould cavity.

As to the nature of the articles that can be made by means of the invention, it is believed that the scope is practically limitless. If the web is to be flexible and have a high fatigue strength, such as for the hinges of stationery binders, automobile components, container lids and foldable plastics blanks for packaging containers, the molten plastics material should be injected into the mould cavity so that it flows transversely of the intended hinge line. If the web is ultimately to serve as a tear line, that is to say if the purpose of the web is to constitute an intentional line of weakness such as would be required for the frangible strip portions of tear-open bottle tops, the plastics material may flow lengthwise of the intended tear line but, since extremely thin webs are obtainable by means of the invention, the material could in this case also flow across the intended tear line because web thickness or thinness is also a contributing factor for determining whether the final web will be repeatedly flexible or frangible.

An example of the invention as applied to the production of stationery binders will now be described with reference to the accompanying diagrammatic drawings, wherein:

FIG. 6 is a sectional side elevation of the FIG. 5 machine.

Figure 1:
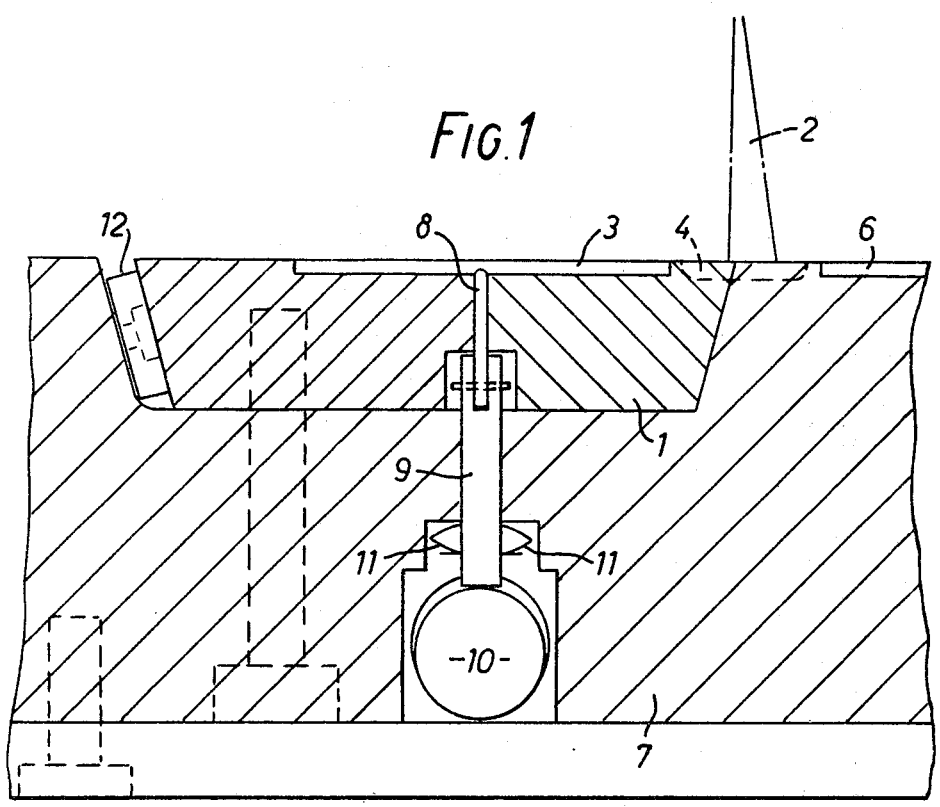
FIG. 1 is a fragmentary sectional elevation of a moulding machine incorporating a moulding tool according to the invention.
Figure 2:
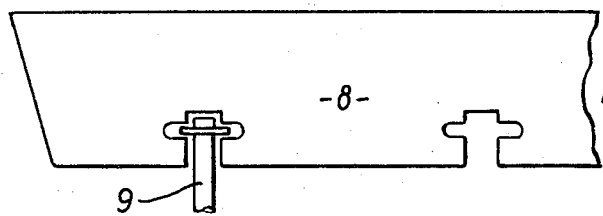
FIG. 2 is a fragmentary side elevation of a part of the FIG. 1 tool.

Referring to FIG. 1, only one part 1 of a two-part moulding tool for a plastics leaf hinge is indicated in relation to a runner 2 through which substantially homogeneous plastics material of substantially constant density, such as polypropylene, is injected in a molten state into a mould cavity 3 via a sprue 4 to fill the mould cavity substantially completely. The injection operation might be termed high pressure injection in so far that pressures in excess of 5000 lbs. per square inch are necessary to fill the mould cavity. However, the pressures involved are less than those that would be necessary to force the plastics material into the mould cavity if the latter were to contain a constriction. In the case of a multiimpression moulding tool, a second mould cavity 6 for moulding a second hinge could be fed from the same runner 2. Still further mould cavities may be provided in the same tool fed from the same or different runners. The mould part 1 is received in a recess in a bed 7 of the moulding machine and contains a blade or plate 8 which can be projected into the cavity 3 by a cam roller 10 acting through cam follower thrust rods 9 (only one is shown) and retracted pneumatically or hydraulically or by springs 11 acting on the rods 9. By providing for play between the thrust rods 9 and the blade 8 (see FIG. 2), the rods will release from the blade during the final stage of the retraction stroke.

It will be evident that, if the cam roller 10 is suitably rotated to lift the thrust rods 9 before the unillustrated part of the moulding tool is started to be lifted off the part 1 but after completion of the injection operation (by which time the injected plastics material will have set at least where the sprue 4 opens into the cavity 3), then the blade 8 will be pressed into the mould cavity and the plastics material overlying the blade tip will be reduced in crosssection relatively to the portions of the moulding to either side of the blade. A web or membrane will thus be formed which pivotally interconnects the two leaves of the moulded leaf spring, the leaves being defined by the said plastics portions to either side of the blade. To ensure proper displacement of the blade 8 in the tool part 1, the latter is preferably laterally adjustable in the bed 7 by means diagrammatically indicated at 12.

It is important to note that the mould cavity defined between the two parts of the moulding tool must still be closed at the time the blade 8 is projected therein because considerable pressure is exerted on the plastics material by the blade. For example, it may require pressures of 10 tons per square inch (almost certainly in excess of 5 tons per square inch) to insert the blade in the mould and deform the plastics material to produce the desired web of reduced cross-section because the injected plastics material substantially completely fills out the mould cavity before the blade is inserted.

For articles requiring more than one web, there will be a corresponding number of additional blades each of which is preferably adjustable in all directions relatively to the mould cavity and relatively to the other blades. Similarly, at least one separate blade would be provided for each article to be moulded in a multi-impression tool. If a block is used instead of a blade or plate, the resultant web may be a rectangular window instead of in strip form. Also, it will be appreciated that the article moulded with the web need not be flat; for example it may be tubular cylindrical with one or more circumferential grooves defined by the webs. Again, it is not necessary that the web be of uniform thickness; in some cases it may be preferable for the web thickness to be tapered or even interrupted; the operative end of the blade will then be of the appropriate taper and/or configuration or the blade may be moved into the mould cavity to varying extents or there may be a plurality of aligned blades.

Figure 3:
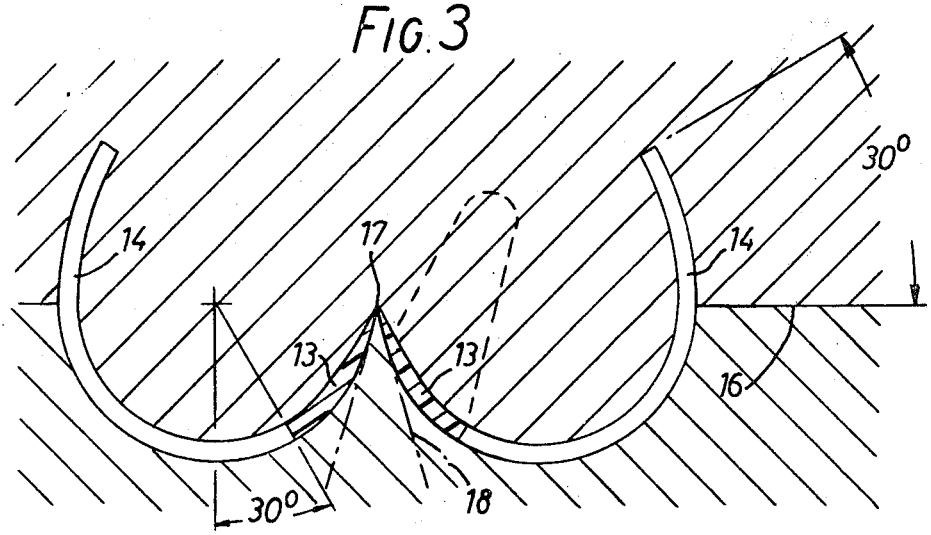
FIG. 3 is an end elevation of a loose-leaf binding device suitable for manufacture by the method of the invention.
Figure 4:
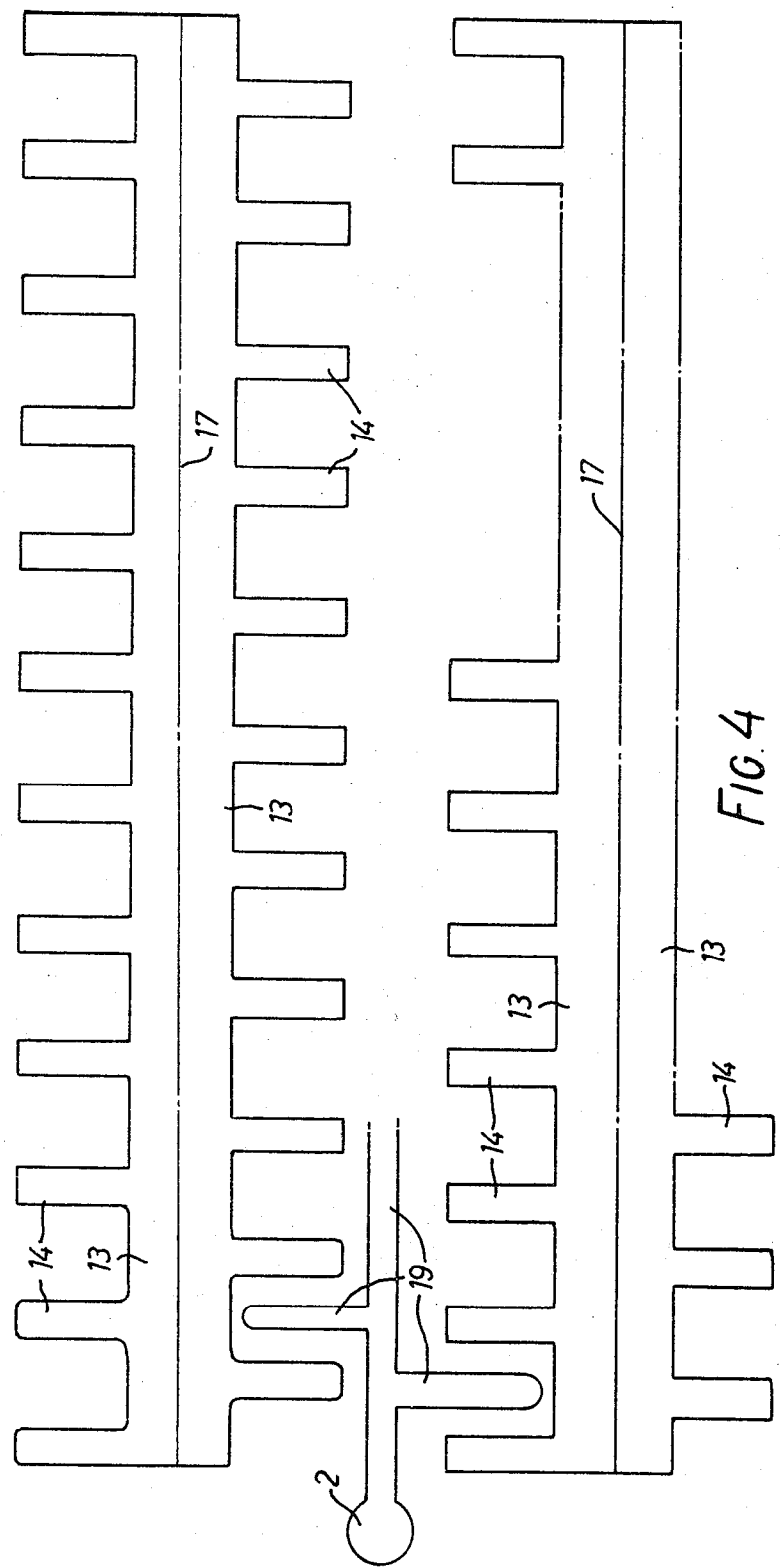
FIG. 4 is a diagram showing the likely layout of a moulding tool for making the FIG. 3 binding device.

FIGS. 3 and 4 show that each leaf 13 of a hinge moulded by means of the invention can carry a plurality of projections 14 to constitute the prongs of a loose-leaf binding device. In FIG. 3, the split and sprue line of the two-part mounting tool may be as represented by the line 16 and a hinge line or web 17 for the leaves 13 may be formed by a pointed blade 18 instead of the blade 8 of FIG. 1 having a rounded operative end. FIG. 4 diagrammatically indicates the hinge lines 17, some of the sprues 19 and the runner 2 for a two-impression tool for moulding binding devices of the FIG. 3 kind. The arrangement can be such that the two mouldings are automatically severed as the mould parts are separated.

Figure 5:
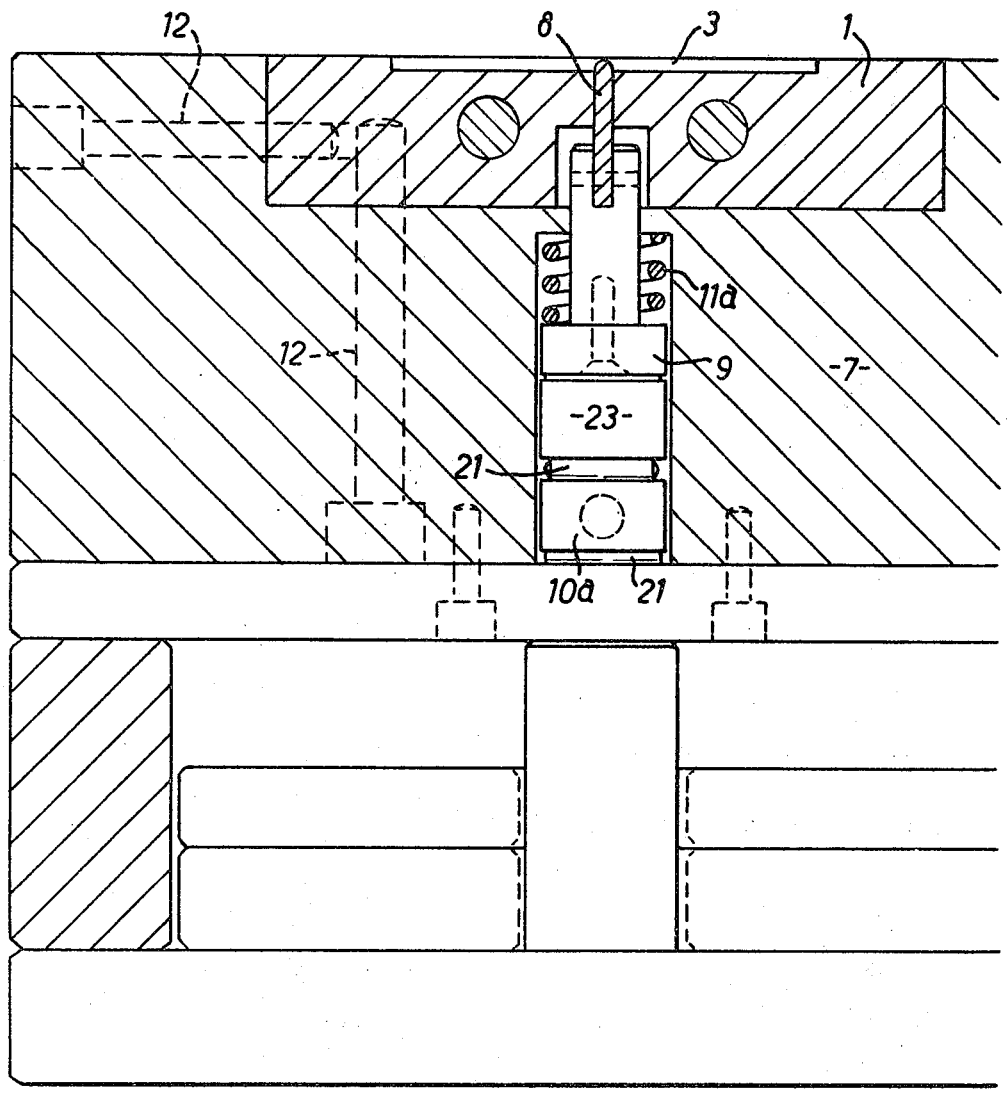
FIG. 5 is a fragmentary view similar to FIG. 1 of a different embodiment of moulding machine.

The fact that the invention permits the formation of webs as narrow as hinge lines and as thin as 0.08 mm from plastics materials that are difficult to mould even without portions of reduced crosssection is considered to be a marked advance in the art. What is more, such narrow and thin hinge lines can be produced in mouldings of which the unreduced portions are only of sheet thickness, for example 0.3 mm. Of course if the mould cavity is only 0.3 mm thick, the amount of blade projection to produce a web of 0.08 mm thickness must be particularly accurately controllable and for this purpose the machine illustrated in FIGS. 5 and 6 may be preferable. In FIGS. 5 and 6 there is shown a moulding machine employing a two-part moulding tool comprising a hydraulically displaceable blade or plate. In this construction, the same reference numerals are used for comparable components shown in FIGS. 1 and 2. Instead of FIG. 1 cam roller, the blade or plate 8 is here projected by a wedge 10a which is reciprocated on roller or needle bearings 21 or thrust pads by hydraulic or pneumatic piston and cylinder means 22. Depending on the distance by which the wedge is advanced to the left-hand side in FIG. 6, a tapered bar 23 above the wedge is lifted to actuate the thrust rods 9 in unison and project the blade 8 by a predetermined amount into the mould cavity 3. On the return stroke of the wedge 10a, retraction of the blade 8 is effected or assisted by springs 11a.

Hydraulic or pneumatic operation with a wedge is preferred to a cam roller because any wear that takes place with a wedge can be readily compensated by increasing the stroke of reciprocation also, it is believed that the accuracy of controlling the amount of projection of the blade 8 is superior with a wedge. Most important, the extent by which the blade is projected can be adjusted without stopping the moulding machine.

I claim:

1. Apparatus for making a plastic article having at least two portions integrally interconnected by at least one thinner web of the same material, said apparatus comprising:
   a. a mould providing a mould cavity and having at least one sprue through which material can be injected into said cavity;
   b. means for injecting substantially homogeneous molten plastic material under high pressure through said at least one sprue into said cavity;
   c. at least one elongate blade movable into said cavity perpendicularly to the longitudinal axis of said blade, for locally reducing the cross-section of the material in said cavity thereby to form said at least one web;
   d. a single elongate force-transmission member operatively connected to and extending parallel to said at least one blade outside of said mould cavity, said force-transmission member having a single taper surface, remote from said cavity, that is inclined in the direction of the longitudinal axis of said blade;
   e. a fixed bearing member disposed at a spacing from said force-transmission member;
   f. a single elongate taper member reciprocally displaceable between said force-transmission member and said fixed bearing member and having a pressure surface co-operable with said single inclined surface of said force-transmission member thereby to cause said at least one blade to be driven into said mould cavity to form said at least one web; and
   g. actuating means operable to displace said taper member between said force-transmission member and said fixed bearing member.

2. Apparatus according to claim 1 wherein said actuating means is hydraulically operable.

3. Apparatus according to claim 2 wherein said blade is connected to said force-transmission member by a plurality of thrust rods, the apparatus further including spring means engaging the force-transmission member thereby to urge said blade towards said fixed bearing member.

* * * * *